F. Hovey.
Copying Press.
No. 4,306. Reissued Mar. 21, 1871.
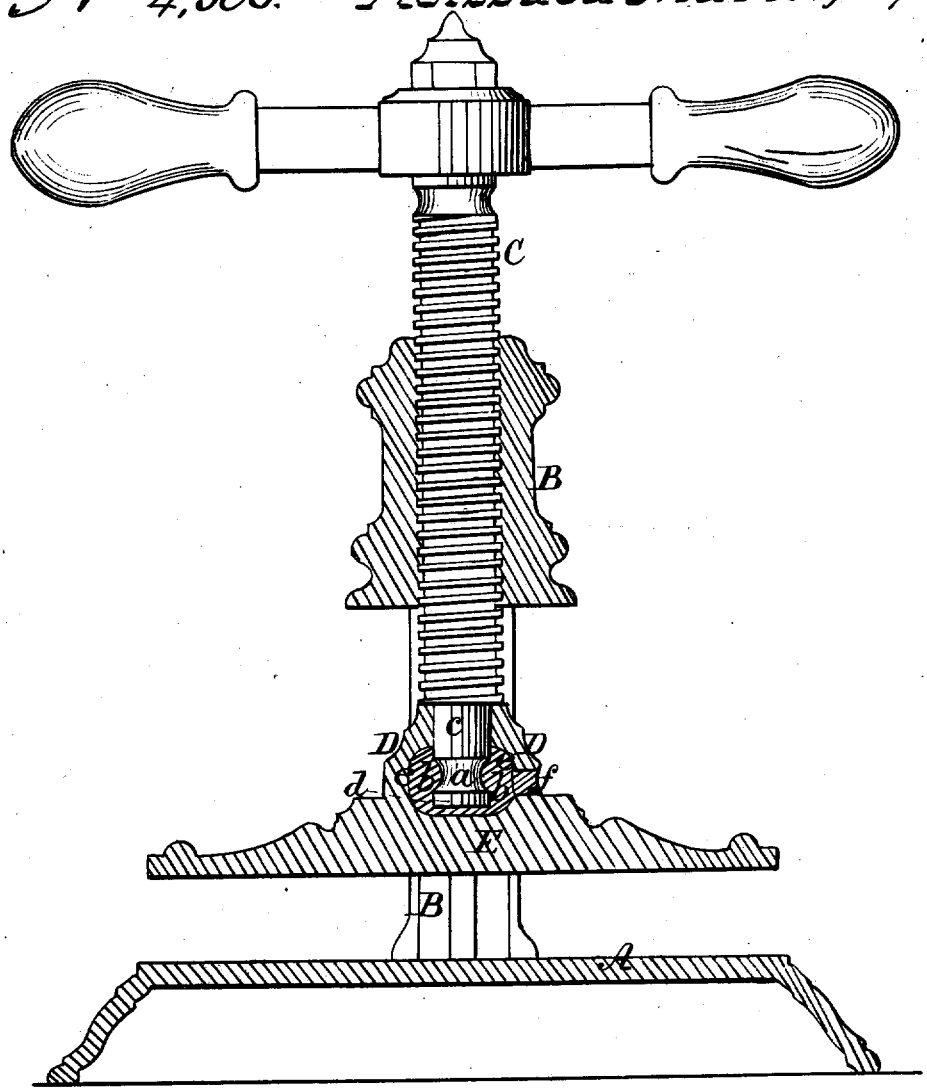
Witnesses.
Henry T. Brown
Geo. H. Douglas
Inventor.
Francis Hovey
N. PETERS, PHOTO-LITHOGRAPHER, WASHINGTON, D. C.

United States Patent Office.

E. W. FROST, OF NEW YORK, N. Y., ASSIGNEE OF FRANCIS HOVEY.

Letters Patent No. 42,141, dated March 29, 1864; reissue No. 4,306, dated March 21, 1871.

IMPROVEMENT IN COPYING-PRESSES.

The Schedule referred to in these Letters Patent and making part of the same.

*To all whom it may concern:*

Be it known that FRANCIS HOVEY, of the city and county of New York, in the State of New York, did invent a new and useful Copying-Press, for which invention Letters Patent of the United States were issued to said FRANCIS HOVEY on the 29th day of March, 1864; that said Letters Patent, by a deed of assignment duly executed and recorded, were conveyed to me, E. W. FROST, of New York city aforesaid; and that, having been advised by counsel learned in the law that said Letters Patent are inoperative and invalid by reason of a defective specification, I have applied to the Commissioner of Patents to issue to me new Letters Patent for said invention, under an amended specification; and I do hereby declare that the following is a full and exact description of the same, reference being had to the accompanying drawing forming part of this specification, said drawing representing a vertical section of a press with my improvement.

In copying-presses the platen is attached to the pressure-screw by means of a socket termed a "foot-piece," in which the screw is obliged to turn freely.

The foot-piece is commonly made of a separate piece of brass, and secured rigidly by screws to the platen.

The object of my invention is to make a cheaper connection than heretofore between the screw and the platen.

I will first describe what I consider the best means of carrying out my invention, and will afterward designate the points which I believe to be new.

A is the bed of the press, and

B, the bridge containing the nut or female screw-thread, in which the pressure-screw C works in the usual manner.

The screw is made of the usual form, its lower part being reduced in diameter below the diameter of the core or bottom of the thread, as shown at *c d*, and having turned in it the groove *a*, for the reception of the zinc or other fusible metal or alloy, *b*, which attaches it to the foot-piece.

D is the foot-piece, cast in the same piece with the platen E, cast hollow, and with a groove or soft-metal chamber *e*, all around the lower part of its interior, for the reception of the zinc or other fusible soft metal or alloy *b*.

The upper part of the soft-metal chamber *e* is bored truly to fit easily to the plain portion *c* of the screw, and it has a hole, *f*, drilled through one side, through which to pour the metal or alloy *b* after the screw is put in. The metal or alloy *b* remains fixed in the soft-metal chamber *e*, and the screw turns freely within it, in the usual manner.

By having the soft-metal chamber *e* arranged in the upper surface of the platen, as shown, I effect a considerable economy in metal, and the expense of facing up the bottom of the foot-piece and top of the platen, and of fitting the screws for attaching the foot-piece to the platen is saved, while the attachment of the screw to the platen is made just as strong and durable, and in all respects as good.

What I claim as the invention of the said HOVEY, and desire to secure by Letters Patent, is—

1. Connecting the screw to the platen of a copying-press by locking it with softer metal than iron, applied in a melted state in a cavity around the screw, substantially as and for the purposes herein set forth.

2. In connection with the above, a chamber, *e*, in the connected platen and foot-piece of a copying-press, and introducing a more fusible metal to fill such chamber and to harden in the groove *a* of the screw C, all the several parts being combined and arranged substantially as and for the purpose herein set forth.

E. W. FROST.

Witnesses:

D. L. FREEBORN,

FRANK A. HADICKE.